United States Patent
Derkx et al.

(10) Patent No.: US 8,116,471 B2
(45) Date of Patent: Feb. 14, 2012

(54) AUDIO SIGNAL DEREVERBERATION

(75) Inventors: Rene Martinus Maria Derkx, Eindhoven (NL); Cornelis Pieter Janse, Eindhoven (NL); Corrado Boscarino, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1116 days.

(21) Appl. No.: 11/572,278

(22) PCT Filed: Jul. 18, 2005

(86) PCT No.: PCT/IB2005/052377
§ 371 (c)(1),
(2), (4) Date: Jan. 18, 2007

(87) PCT Pub. No.: WO2006/011104
PCT Pub. Date: Feb. 2, 2006

(65) Prior Publication Data
US 2008/0300869 A1    Dec. 4, 2008

(30) Foreign Application Priority Data
Jul. 22, 2004  (EP) .................................... 04103509

(51) Int. Cl.
*H04B 3/20* (2006.01)
*G10L 21/02* (2006.01)
(52) U.S. Cl. ......................................... 381/66; 704/226
(58) Field of Classification Search ................... 381/66, 381/63; 704/226
See application file for complete search history.

(56) References Cited

U.S. PATENT DOCUMENTS

| | | | | |
|---|---|---|---|---|
| 4,796,237 A | * | 1/1989 | Hutchens et al. | 367/35 |
| 6,622,030 B1 | | 9/2003 | Romesburg et al. | |
| 7,844,059 B2 | * | 11/2010 | Tashev et al. | 381/66 |
| 2004/0213415 A1 | * | 10/2004 | Rama et al. | 381/63 |
| 2008/0292108 A1 | * | 11/2008 | Buck et al. | 381/63 |

OTHER PUBLICATIONS

International Search Report of International Application No. PCT/IB2005/052377 Contained in International Publication No. WO2006011104.
Written Opinion of the International Searching Authority for International Application No. PCT/IB2005/052377.
Lebart et al: "A New Method Based on Spectral Subtraction for Speech Dereverberation"; Acustica-Acta Acustica S. Hirzel Verlag Germany, vol. 87, No. 3, May 2001, pp. 359-366, XP009053193.
Habets, E.: "Single-Channel Speech Dereverberation Based on Spectral Subtraction"; Proceedings of PRORISC 2004, 'Online!' Nov. 25, 2004, pp. 250-254, XP002343438.
Martin, R.: "Spectral Subtraction Based on Minimum Statistics"; Signal Processing: Theories and Applications, vol. 2, Sep. 13, 2004, pp. 1182-1185, XP009026531.

* cited by examiner

*Primary Examiner* — Hai Phan

(57) ABSTRACT

A method of estimating the reverberations in an acoustic signal (y) comprises determining the frequency spectrum (Y) of the signal (y), providing a first parameter ($\alpha$) indicative of the decay of the reverberations part (r) of the signal over time, and providing a second parameter ($\beta$) indicative of the amplitude of the direct part (d) of the signal relative to the reverberations part (r). An estimated frequency spectrum ($\hat{R}$) of the reverberations signal (r) is produced using the frequency spectrum (Y) of a previous frame, the first parameter ($\alpha$), and the second parameter ($\beta$). The second parameter ($\beta$) is preferably inversely proportional to the early-to-late ratio of the signal (y).

27 Claims, 3 Drawing Sheets

AUDIO SIGNAL DEREVERBERATION

Figure 1:
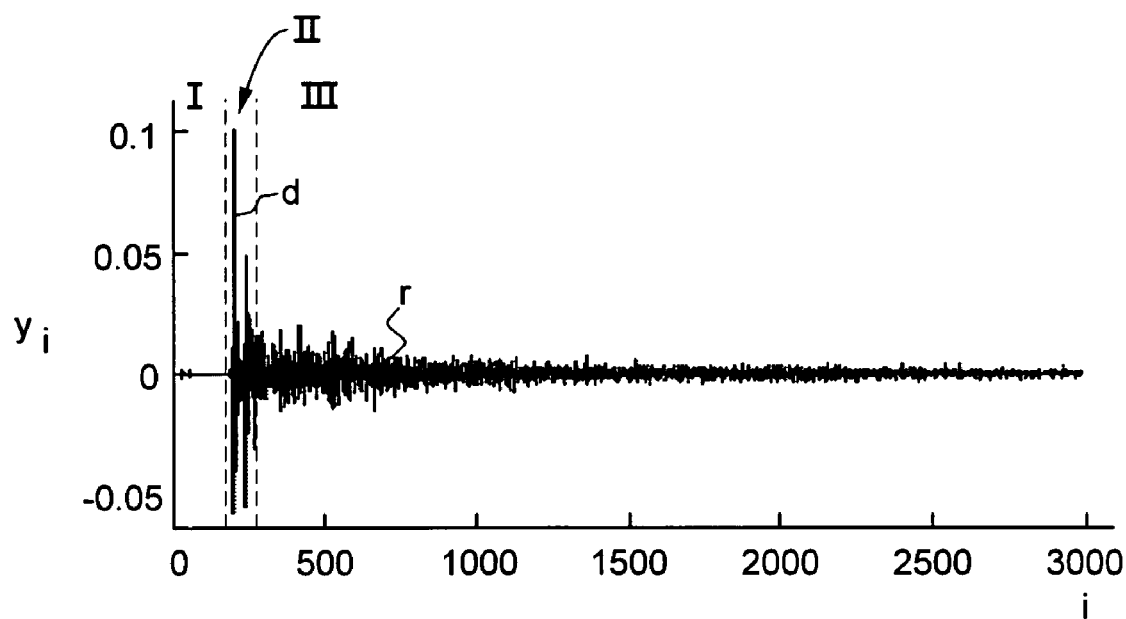

The present invention relates to the dereverberation of audio signals. More in particular, the present invention relates to a method and a device for estimating the reverberations in audio signals, in particular non-stationary audio signals such as speech.

It is well known that a signal, such as an acoustic signal, may contain reverberations or echoes from various surfaces. In a room, for example, an acoustic signal (such as speech or music) is reflected by the walls, the ceiling and the floor. A microphone present in the room will therefore receive the acoustic signal as a combination of a direct signal (received directly from the source) and an indirect signal (received via reflecting surfaces). This indirect signal is referred to as the reverberations part of the received signal.

Many attempts have been made to separate the desired (that is, direct) signal from its reverberations. The paper "A New Method Based on Spectral Subtraction for Speech Dereverberation" by K. Lebart, J. M. Boucher and P. N. Denbigh, Acta Acustica, Vol. 87, pages 359-366 (2001), for example, discloses a method for the suppression of late room reverberation from speech signals based on spectral subtraction. In this known method, the frequency spectrum of the reverberations part of the received signal is estimated using the delayed frequency spectrum of the received signal and a (first) parameter that is indicative of the decay of the reverberations part over time. The frequency spectrum of the reverberations part may then be used to estimate, by spectral subtraction, the frequency spectrum of the direct part.

This known method works well for signals of which the amplitudes of the direct part and reverberations part are similar or, in other words, of which the energy content of the direct part is (much) smaller than the energy content of the reverberations part. However, when the amplitude (and hence the energy content) of the direct signal is significantly larger than the amplitude (and energy content) of the reverberations signal, the known method introduces errors which result in signal distortion.

It is therefore an object of the present invention to overcome these and other problems of the Prior Art and to provide a method of and a device for estimating the reverberations part of an acoustic signal that takes any difference in energy contents of the direct part and the reverberations part into account.

Accordingly, the present invention provides a method of estimating the reverberations in a signal comprising a direct part and a reverberations part, the method comprising the step of providing an estimate of the frequency spectrum of the reverberations part using a first parameter, a second parameter and the frequency spectrum of the signal, wherein the first parameter is indicative of the decay of the reverberations part over time, and wherein the second parameter is indicative of the amplitude of the direct part relative to the reverberations part of the signal.

By providing a second parameter that is indicative of the amplitude of the direct part relative to the reverberations part, the relative amplitudes of these two signal parts is taken into account. As a result, it is possible to compensate for any difference in amplitudes and thereby to obtain a more accurate estimate.

It will be understood that the frequency spectrum of the direct part, and hence the direct signal part itself, may be obtained from the estimated frequency spectrum of the reverberations part using well-known spectral subtraction techniques.

In a preferred embodiment, the second parameter is inversely proportional to the early-to-late ratio of the signal. The early-to-late ratio is a ratio that indicates the amplitude of the direct (early) part relative to the reverberations (late) part of the signal.

In an advantageous embodiment, the step of providing an estimate of the frequency spectrum of the reverberations part involves using a previous estimate of the frequency spectrum of the reverberations part. In this way, the estimate is determined using a previous value and an update term, the update term preferably comprising the frequency spectrum of the signal.

In a preferred embodiment, therefore, the estimate of the frequency spectrum of the reverberations part is equal to the first parameter times a previous absolute value of the frequency spectrum, minus a third parameter times the difference of the previous absolute value of the frequency spectrum and a previous estimate of the frequency spectrum of the reverberations signal, wherein the third parameter is equal to the first parameter minus the second parameter.

In a practical embodiment, the method of the present invention comprises the further steps of:
defining frames containing time-limited segments of the signal, and
determining, for each frame, the frequency spectrum of the signal.

The frames may overlap partially, so that some signal values are used more than once.

Although a single value of the second parameter can be determined for a situation in which the distance between the source and the microphone (and hence the relative amplitude of the direct signal) does not change, it is preferred that the second parameter is determined for each frame separately. In this way, a more accurate determination of the second parameter is made possible, in particular when movement is involved. In accordance with the present invention, the second parameter is preferably determined using only the signal and derivatives thereof.

It is further preferred that for each time segment of the signal, the immediately preceding time segment is used to determine the frequency spectrum of the signal itself and the estimated frequency spectrum of the direct part that are used for the estimation of the frequency spectrum of the reverberations part in the current time segment.

In order to obtain an even better estimate it is preferred that the frequency spectrum of the signal is determined, for each frame, per frequency band, and that the second parameter, the estimated frequency spectrum of the direct signal and the estimated frequency spectrum of the reverberations part are also determined per frequency band. In this way, separate estimates can be made for individual frequency bands. The choice of frequency bands may be dictated by the particular signal.

As stated above, the frequency spectrum of the reverberations part is estimated using the frequency spectrum of a previous frame, the first parameter, the second parameter, and the estimated frequency spectrum of the reverberations part of a previous frame (for the first frame, the estimate of the previous frame may be assumed to have a predetermined value, for example zero). The method may comprise the further step of dereverberating the signal using the estimate of the frequency spectrum of the reverberations part, preferably using spectral subtraction and reconstruction of the dereverberated signal on the basis of the spectrum resulting from the subtraction.

The present invention also provides a computer program product for carrying out the method defined above. The computer program product may comprise a carrier, such as a CD, DVD, or a floppy disc, on which a computer program is stored in electronic or optical form. The computer program specifies the method steps to be carried out by a general purpose computer or a special purpose computer.

The present invention additionally provides a device for carrying out the method as defined above, as well as an audio system, such as a speech recognition system comprising such a device.

The present invention will further be explained below with reference to exemplary embodiments illustrated in the accompanying drawings, in which:

FIG. 1 schematically shows a typical example of the impulse response of a room.

Figure 2:
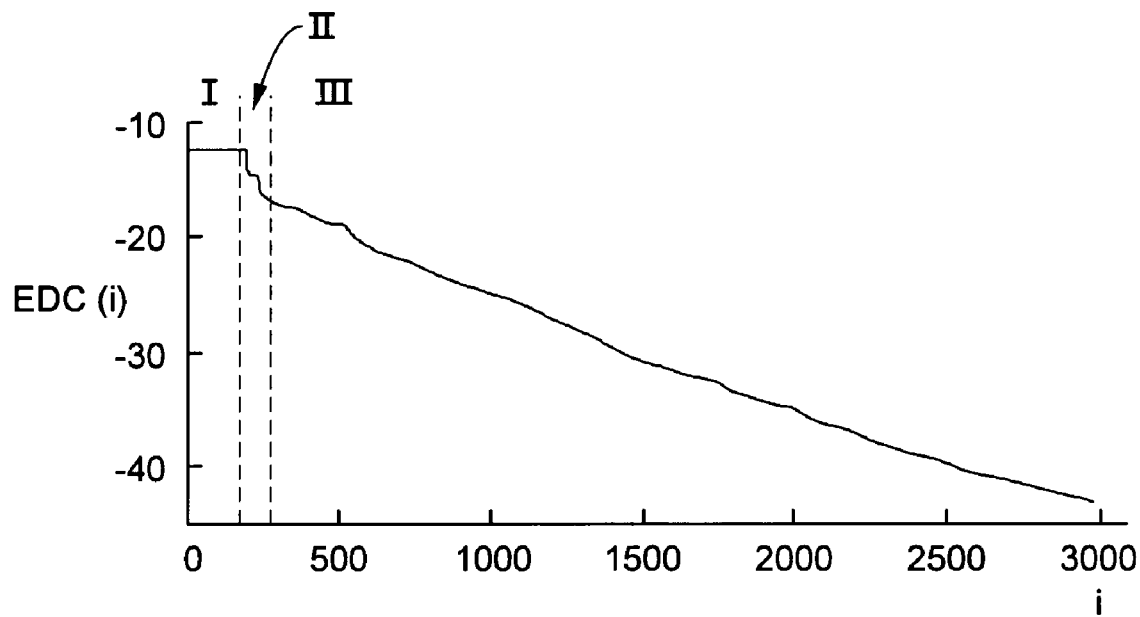

FIG. 2 schematically shows the energy decay curve of the room impulse response of FIG. 1.

Figure 3:
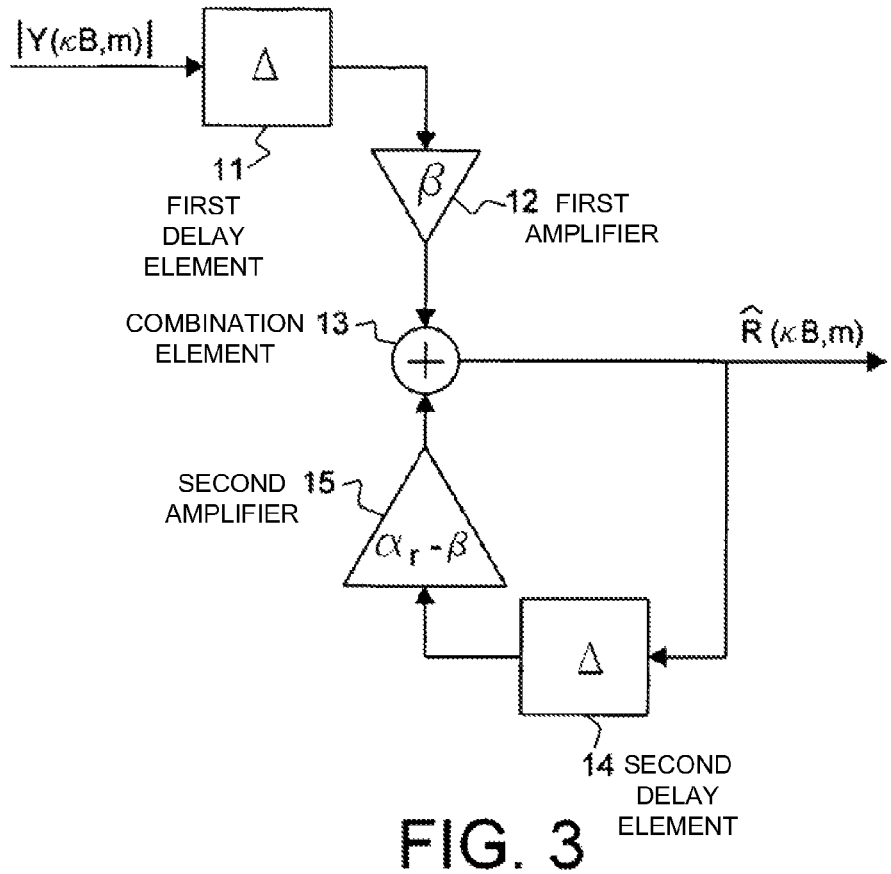

FIG. 3 schematically shows a filter arrangement for estimating reverberations according to the present invention.

Figure 4:
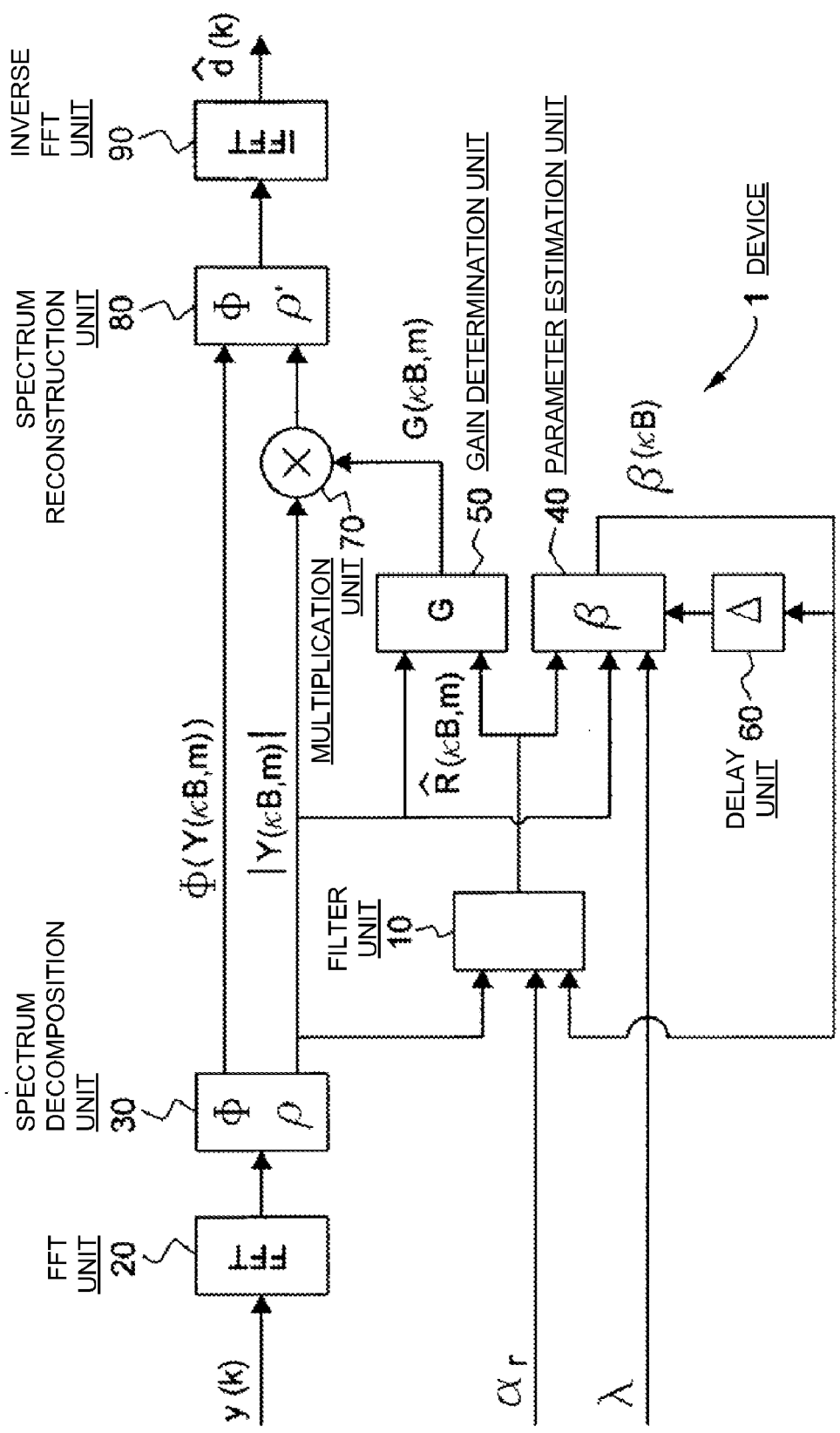

FIG. 4 schematically shows a device for estimating reverberations according to the present invention.

Figure 5:
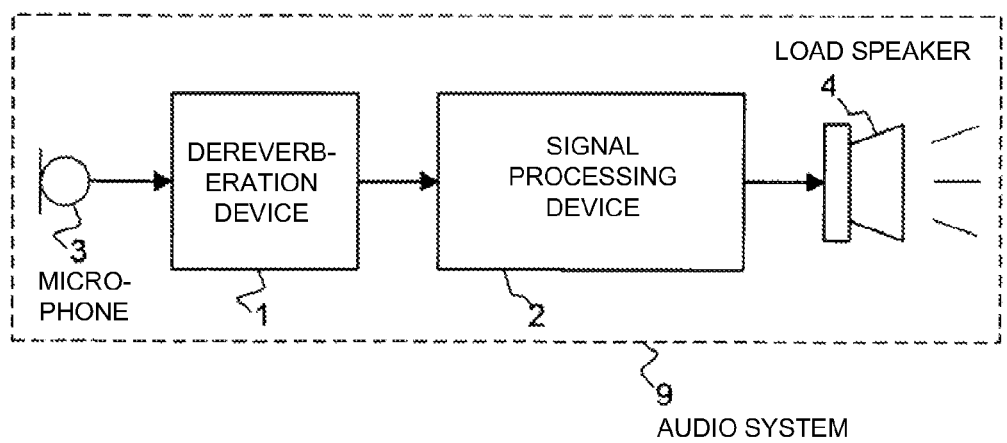

FIG. 5 schematically shows a system which incorporates the inventive device of FIG. 4.

The exemplary signal shown in FIG. 1 represents the impulse response of a room, that is, the signal received by a microphone in a room when an acoustic impulse (a pulse of an extremely short duration) is produced in the same room. This impulse response contains a first (signal delay) section I which contains no significant signal components, a second section II containing a direct signal part d and a third section III containing an indirect of reverberations signal part r. The direct signal part d and the reverberations signal part r together constitute the signal y, the amplitude $y_i$ of which is plotted as a function of the sample index i. It will be understood that the sample index i of a sampled (digitized) signal corresponds with the time in an analog signal.

The direct signal part d is received via the direct signal path, that is, without being reflected, while the indirect or reverberations part r is received via walls and other reflecting surfaces. As can be seen, the amplitude $y_i$ of the reverberations part r decays exponentially. This is also illustrated in FIG. 2 which represents the Energy Decay Curve EDC of the signal y as a function of the sample index i. The EDC is defined as:

$$EDC(i) = 10\log\sum_{m=i}^{\infty} y_m^2 \quad (1)$$

Expressed in words, the energy decay curve EDC yields, for a given sample index i, ten times the logarithm of the energy of the remainder of the signal. It can be seen that in the third section III containing the EDC of the reverberations part r, the EDC is approximately linear (it is noted that the values of the EDC shown are negative as all values of $y_i$ in the present example are much smaller than one). As the EDC is logarithmic, this linear decay of the EDC represents an exponential decay of the signal y. The slope of the EDC in the section III may be represented by a parameter $\alpha_r$, where the subscript r refers to the reverberations.

It can further be seen in FIG. 2 that a step occurs in the EDC between the regions I and III. This step represents the energy of the direct signal part d relative to the reverberations part r (FIG. 1). In some situations, this step is relatively small, the reverberations part r having an amplitude similar to (or larger than) the direct part d. In the example shown, however, the step in the EDC is relatively large as the direct part d of FIG. 1 is significantly larger than the reverberations part r. Ignoring this step may lead to estimation errors when estimating the (frequency spectrum of the) reverberations part r. The present invention, however, takes this step into account using a further parameter $\beta$ and thereby produces much improved results.

The signal y of FIG. 1 can be dereverberated using a known technique, such as a single channel noise suppression technique, replacing the noise frequency spectrum with as estimate of the reverberations frequency spectrum. In the case of spectral subtraction this involves determining the frequency spectrum Y of the signal, estimating the frequency spectrum R of the reverberations, subtracting this estimated reverberations frequency spectrum from the signal frequency spectrum so as to obtain an estimated frequency spectrum of the direct signal part, and reconstructing the direct signal on the basis of its estimated frequency spectrum.

According to the Prior Art mentioned above this may be accomplished as follows. The signal y is divided into frames that each contain a number of samples of the digitized signal. Each frame may, for example, contain 128 or 256 samples. Zeroes may be added (so-called "zero padding") to arrive at a suitable number of samples per frame. The frames typically but not necessarily overlap partially, the term "block" is used to refer to the "new" samples of each frame.

Advantageously a window, for example a Hamming window known per se, is applied to alleviate the introduction of artifacts. For each frame the frequency spectrum Y is determined using the well-known Fast Fourier Transform (FFT). For each frame $\kappa$ an estimate $\hat{R}$ of the reverberations frequency spectrum R is determined by:

$$\hat{R}(\kappa B, m) = \alpha_r \cdot |Y((\kappa-1)B, m)| \quad (2)$$

where B is the block size (that is, the number of new samples in each frame), m is the frequency, the vertical bars indicate the absolute value, and $\alpha_r$ is the parameter indicating the decay speed of the reverberations part r. Mathematically, $\alpha_r$ may be defined as $$\alpha_r = \left(e^{-2\Delta \frac{B}{F_s}}\right)^{\frac{1}{2}} \quad (3)$$

where $F_s$ is the sampling frequency and $$\Delta = \frac{3\ln 10}{T_{60}} \quad (4)$$

In being the natural logarithm (3 ln 10 is approximately equal to 6.9) and $T_{60}$ being the reverberation time, that is, the length of time after which the signal level has dropped 60 dB (deciBel) relative to the initial signal level.

The estimate $\hat{R}$ of the reverberations frequency spectrum may be used to determine a gain function:

$$G(\kappa B, m) = \max\left(\frac{|Y(\kappa B, m)| - \hat{R}(\kappa B, m)}{|Y(\kappa B, m)|}, \lambda\right) \quad (5)$$

where $\lambda$ is the so-called spectral floor, a value which ensures that any severe distortion of the dereverberated signal is avoided. A typical value of $\lambda$ is 0.1, although other values may also be used. The frequency spectrum Y of the original signal is multiplied by this gain factor G(κB, m) to yield the frequency spectrum D of the direct (dereverberated) signal d.

Although this known method is very effective, it leads to signal distortions when the direct part d of the signal y has a large amplitude (energy) relative to the reverberations part r or, in other words, when the signal shows a large step in region II of FIG. 2. This amplitude of the direct part relative to the reverberations part may be expressed using the Early-to-Late Ratio ELR, which may be written as:

$$ELR(k) = 10\log\left(\sum_{i=0}^{k} y_i^2 \bigg/ \sum_{i=k}^{\infty} y_i^2\right) \quad (6)$$

where k is the sample number separating regions II and III in FIG. 2, that is, the point where the drop in the EDC curve ends and the relatively straight part begins. The ELR therefore determines the (logarithm of the) energy ratio of the direct part (up to sample k) and the reverberations part (from sample k). The ELR is sometimes also referred to as Clarity Index.

When the Early-to-Late Ratio ELR is small (for example smaller than 0 dB, using the definition above), the energy content of the direct part d is small compared to the reverberations part r of the signal y, and the Prior Art method discussed above can effectively be used to dereverberate the signal y. However, when the ELR is large (for example larger than 0 dB, or larger than 5 dB, using the definition above), the known method introduces distortions as the step in region II of the EDC (FIG. 2) is ignored.

Accordingly, the present invention uses an improved estimation method in which the relative energy contents of the direct signal part d and the reverberations signal part r are taken into account.

Starting from equation (2) above, the present invention proposes to correct the estimation of the frequency spectrum R of the reverberations part r by subtracting a correction term γ·C(κ), where γ is a factor dependent on the ELR, and where C is a function of the frame number κ (that is, time), and possibly also of the block size B and the frequency m:

$$\hat{R}(\kappa B,m)=\alpha_r \cdot |Y((\kappa-1)B,m)|-\gamma \cdot C((\kappa-1)B,m) \quad (7)$$

The present invention further proposes to use the estimate $\hat{D}$ of the direct part frequency spectrum D as the function C:

$$\hat{R}(\kappa B,m)=\alpha_r \cdot |Y((\kappa-1)B,m)|-\gamma \cdot \hat{D}((\kappa-1)B,m) \quad (8)$$

It will be understood that there may be other functions C that have the required properties.

Since the estimate $\hat{D}$ of the direct part frequency spectrum D can be expressed as:

$$\hat{D}(\kappa B,m)=|Y(\kappa B,m)|-\hat{R}(\kappa B,m) \quad (9)$$

equation (8) may be rewritten as:

$$\hat{R}(\kappa B,m)=(\alpha_r-\gamma)\cdot|Y((\kappa-1)B,m)|+\gamma\cdot\hat{R}((\kappa-1)B,m) \quad (10)$$

Introducing a parameter $\beta(\kappa B)=\alpha_r-\gamma$, with $0 \leq \beta(\kappa B) \leq \alpha_r$, equation (10) can be written as:

$$\hat{R}(\kappa B,m)=\beta(\kappa B)\cdot|Y((\kappa-1)B,m)|+(\alpha_r-\beta(\kappa B))\cdot\hat{R}((\kappa-1)B,m) \quad (11)$$

Using equation (9), equation (11) may also be expressed as:

$$\hat{R}(\kappa B,m)=\beta(\kappa B)\cdot\hat{D}((\kappa-1)B,m)+\alpha_r\cdot\hat{R}((\kappa-1)B,m) \quad (12)$$

It can be shown that:

$$\beta(\kappa B)=\frac{(1-\alpha_r)}{ELR(\kappa B)} \quad (13)$$

in other words, the (second) parameter β(κB) is inversely proportional to the Early-to-Late Ratio ELR. It is further noted that both β and ELR are functions of time (that is, the frame index κ times the block index B), and that β (and ELR) may also depend on the frequency (or sub-band) m: β(κB,m).

It can be seen from equation (11) that the estimate $\hat{R}(\kappa B,m)$ according to the present invention combines both the (absolute value of the) frequency spectrum Y of the previous frame and the previous estimate, while taking the ELR into account. It can further be seen from equations (11) and (12) that for a large ELR, β(κB) is small and the estimate $\hat{R}(\kappa B,m)$ is effectively based on the previous estimate, suppressing the influence of the spectrum Y. For a small ELR, β(κB) is "large" and approximately equal to $\alpha_r$, and $\hat{R}(\kappa B, m)$ is then approximately equal to $\alpha_r \cdot |Y((\kappa-1)B,m)|$, as in the Prior Art.

It can therefore be seen that the method of the present invention is consistent with the Prior Art in case the Early-to-Late Ratio ELR is small, while providing an important improvement when ELR is large.

It is noted that the method of the present invention may be carried out per sub-band, that is per frequency m, or independent of the frequency, using a single term for all frequencies.

The method of the present invention may be implemented in software or in hardware. An exemplary hardware implementation is shown in FIG. 3, where a filter section 10 is shown. The filter section 10 comprises a first delay element 11, a first amplifier 12, a combination element 13, a second delay element 14 and a second amplifier 15.

In the example shown, the first delay element 11 receives the absolute value (that is, the magnitude) |Y(κB,m)| of the frequency spectrum Y and outputs the delayed absolute value |Y((κ−1)B,m)|. In the preferred embodiment, the delay Δ is equal to one frame. In the amplifier 12, this delayed absolute value is multiplied by the (second) parameter β and fed to the combination element 13 which is preferably constituted by an adder.

The combination element 13 also receives the output signal of the second multiplier 15 and outputs the estimate $\hat{R}(\kappa B,m)$. This estimate is received by the second delay element 14 which outputs the delayed estimate $\hat{R}((\kappa-1)B,m)$ to the second amplifier 15. This delayed estimate $\hat{R}((\kappa-1)B,m)$ is multiplied with the factor $(\alpha_r-\beta)$ in the amplifier 15 and fed to the combination element 13. As can be seen, the filter section 10 produces the same result as equation (11) above.

The parameter β (or β(κB)) may be predetermined. For example, a fixed value of 0.1 or 0.2 could be used for a situation, provided an estimate of the ELR for that situation is known. It is preferred, however, to estimate β(κB) for each signal. Of course β(κB) can be estimated on the basis of the Early-to-Late Ratio, using formula (13) above. However, starting from an initial value of β(κB) (which may be a predetermined value, for example zero), an update may be provided using the formula:

$$\beta(\kappa B)=\beta((\kappa-1)B)+f(|Y(\kappa B,m)|,\hat{R}(\kappa B,m),\lambda) \quad (14)$$

where the function f( ) is an update function and the parameter λ is the spectral floor mentioned above. An example of an update function which uses the absolute value |Y(κB,m)| and the estimated spectrum $\hat{R}(\kappa B,m)$ is:

$$\beta(\kappa B) = \beta((\kappa-1)B) + \mu \frac{\sum_{m=0}^{M-1}(1-\lambda)|Y(\kappa B, m)| - \hat{R}(\kappa B, m)}{\sum_{m=0}^{M-1}(1-\lambda)|Y(\kappa B, m)| + \varepsilon} \quad (15)$$

where κ is an auxiliary parameter having a (very small) value to prevent division by zero, and where μ is a non-negative parameter controlling the speed and accuracy of the update of β(κB).

A preferred embodiment of a device for dereverberating a signal is schematically shown in FIG. 4. The exemplary device 1 shown in FIG. 4 comprises a filter unit 10, an FFT unit 20, a spectrum decomposition unit 30, a parameter estimation unit 40, a gain determination unit 50, a delay unit 60, a multiplication unit 70, a spectrum reconstruction unit 80 and an inverse FFT unit 90.

The FFT unit 20 receives the (digital) signal y(k) and performs a well-known Fast Fourier Transform on a frame of signal samples. It will be understood that a A/D (analog/digital) converter may be present if the original signal is analog. The (complex) spectrum Y(m) produced by the FFT unit 20 is fed to the decomposition unit 30 which decomposes the complex spectrum into a phase part φ and a magnitude part ρ. This magnitude ρ is equal to the absolute value |Y(κB,m)|, where κ is the frame index (frame number), B is the block size and m is the frequency, as before. The phase part φ is fed directly to the spectrum reconstruction unit 80, while the magnitude part ρ is fed to the filter unit 10, the parameter unit 40, the gain unit 50 and the multiplication unit 70.

The filter unit 10, which may be identical to the filter unit 10 of FIG. 3, also receives the parameters $α_r$ and β(κB) to produce the estimated reverberations spectrum $\hat{R}$(κB,m) which is fed to the units 40 and 50. The unit 40 produces an updated value of β(κB), for example in accordance with equation 15, using the estimate $\hat{R}$(κB,m), the parameter λ, and the delayed value β((κ−1)B) output by delay (Δ) unit 60.

The unit 50 produces a gain factor G(κB,m), for example in accordance with equation (5). This gain factor is fed to multiplier 70 where it is multiplied with the absolute value spectrum |Y(κB,m)| to produce the dereverberated spectral magnitude ρ'. The reconstruction unit 80 reconstructs the dereverberated spectrum |$\hat{D}$(κB,m)| on the basis of φ and ρ'. This spectrum |$\hat{D}$(κB,m)| is then converted into the dereverberated time signal $\hat{d}$(k) by the IFFT (Inverse Fast Fourier Transform) unit 90.

An audio system incorporating the device 1 of FIG. 4 is schematically shown in FIG. 5. The system 9 comprises a dereverberation device 1, a signal processing device 2, a microphone 3 and a loudspeaker 4. The dereverberation device 1 is preferably the device 1 of FIG. 4 or its equivalent. The signal processing device 2 may comprise an amplifier and/or any other suitable audio signal processing means. The microphone 3 may be substituted with a set of microphones. Similarly, the loudspeaker 4 may be substituted with a set of loudspeakers or other suitable transducers. The order of the dereverberation device 1 and the signal processing device 2 may be reversed, and other devices (not shown) may be added. The system 9 may, for example, constitute a conference system, a hands-free telephony system, or a speech recognition system.

The present invention is based upon the insight that the energy content ratio of the direct signal part and the reverberations signal part has to be taken into account when dereverberating a signal. By introducing a parameter related to this energy content ratio, a better dereverberation which introduces less signal distortion is achieved.

The present invention could be summarized as a method of estimating the reverberations in a signal comprising a direct part and a reverberations part, the method comprising the steps of estimating the spectrum of the reverberations part using a first parameter and the spectrum of the signal, and correcting the estimated spectrum using correction term involving a second parameter, wherein the second parameter is indicative of the amplitude of the direct part relative to the reverberations part of the signal.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

The term computer program product should be understood to include any physical realization, e.g. an article of manufacture, of a collection of commands enabling a processor—generic or special purpose—, after a series of loading steps to get the commands into the processor, to execute any of the characteristic functions of an invention. In particular the computer program product may be realized as program code, processor adapted code derived from this program code, or any intermediate translation of this program code, on a carrier such as e.g. a disk or other plug-in component, present in a memory, temporarily present on a network connection—wired or wireless—, or program code on paper. Apart from program code, invention characteristic data required for the program may also be embodied as a computer program product.

It will be understood by those skilled in the art that the present invention is not limited to the embodiments illustrated above and that many modifications and additions may be made without departing from the scope of the invention as defined in the appending claims.

The invention claimed is:

1. A method of estimating the reverberations in a signal (y), the signal (y) including a combination of a direct part (d) and a reverberations part (r), the method comprising:
    providing, via a filter device, an estimate ($\hat{R}$) of the frequency spectrum (R) of the reverberations part (r) using a first parameter (α), a second parameter (β) and the frequency spectrum (Y) of the signal (y), the filter device being responsive to the first parameter (α), the second parameter (β) and the frequency spectrum (Y) of the signal (y) for providing the estimate ($\hat{R}$) of the frequency spectrum (R) of the reverberations part (r),
    wherein the first parameter (α) is indicative of the decay of the reverberations part (r) over time, and wherein the second parameter (β) is indicative of a step in relative energy content in an energy decay curve of a room impulse response, wherein the step occurs in the energy decay curve between a first region and a third region of the energy decay curve, wherein the first region contains the energy decay curve of a first signal decay with no significant signal components, a second region contains the energy decay curve of the direct signal part (d), and the third region contains the energy decay curve of an indirect signal component of the reverberations part (r), further wherein the step is indicative of an amplitude of the direct part (d) relative to an amplitude of the reverberations part (r) of the signal (y).

2. The method according to claim 1, wherein the second parameter (β) is inversely proportional to the early-to-late ratio (ELR) of the signal (y).

3. The method according to claim 1, wherein providing the estimate ($\hat{R}$) of the frequency spectrum (R) of the reverberations part (r), via the filter device, involves using a previous estimate ($\hat{R}$) of the frequency spectrum (R) of the reverberations part (r).

4. The method according to claim 1, further comprising:
defining, via an analog to digital converter, frames ($\kappa$) containing time-limited segments of the signal (y), and
determining, for each frame ($\kappa$), via a Fast Fourier Transform (FFT) device, the frequency spectrum (Y) of the signal (y).

5. The method according to claim 4, wherein the frames overlap partially.

6. The method according to claim 4, further comprising:
providing, for each frame ($\kappa$), via the filter device, an estimated frequency spectrum ($\hat{R}$) of the reverberations part (r) using the frequency spectrum (Y) of a previous frame, the first parameter ($\alpha$), the second parameter ($\beta$), and the estimated frequency spectrum ($\hat{R}$) of the reverberations part (r) of a previous frame.

7. The method according to claim 6, wherein the previous frame is an immediately preceding frame ($\kappa$-1).

8. The method according to claim 4, wherein the second parameter ($\beta$) is determined for each frame ($\kappa$) separately.

9. The method according to claim 1, further comprising:
dereverberating, via a spectrum reconstruction device and an Inverse Fast Fourier Transform (IFFT) device, the signal (y) using the estimate ($\hat{R}$) of the frequency spectrum (R) of the reverberations part (r) to provide a dereverberated signal that comprises a reconstructed direct part (d) of the signal (y).

10. A non-transitory computer-readable medium embodied with a computer program for being executed via a computer for carrying out the method according to claim 1.

11. A method of estimating the reverberations in a signal (y), the signal (y) including a combination of a direct part (d) and a reverberations part (r), the method comprising:
providing, via a filter device, an estimate ($\hat{R}$) of the frequency spectrum (R) of the reverberations part (r) using a first parameter ($\alpha$), a second parameter ($\beta$) and the frequency spectrum (Y) of the signal (y), the filter device being responsive to the first parameter ($\alpha$), the second parameter ($\beta$) and the frequency spectrum (Y) of the signal (y) for providing the estimate ($\hat{R}$) of the frequency spectrum (R) of the reverberations part (r),
wherein the first parameter ($\alpha$) is indicative of a decay of the reverberations part (r) over time, and wherein the second parameter ($\beta$) is indicative of an amplitude of the direct part (d) relative to the reverberations part (r) of the signal (y), and wherein the estimate ($\hat{R}$) of the frequency spectrum (R) of the reverberations part (r) is equal to (i) the first parameter ($\alpha$) times a previous absolute value of the frequency spectrum (Y), minus (ii) third parameter ($\gamma$) times the difference of the previous absolute value of the frequency spectrum (Y) and a previous estimate ($\hat{R}$) of the frequency spectrum (R) of the reverberations signal (r), wherein (iii) the third parameter ($\gamma$) is equal to the first parameter ($\alpha$) minus the second parameter ($\beta$).

12. A device for estimating the reverberations in a signal (y) including a direct part (d) and a reverberations part (r), the device comprising:
means for providing an estimate ($\hat{R}$) of the frequency spectrum (R) of the reverberations part (r) using a first parameter ($\alpha$), a second parameter ($\beta$) and the frequency spectrum (Y) of the signal (y), said means including a filter device that comprises (i) a first delay device for receiving an absolute value of the frequency spectrum (Y) of the signal (y) and outputting a delayed absolute value of the frequency spectrum (Y), (ii) a first amplifier for multiplying the delayed absolute value of the frequency spectrum (Y) by the second parameter ($\beta$) and outputting a first amplified output, (iii) a combination device for receiving and combining the first amplified output with a second amplified output and for outputting the combined first and second amplified outputs as the estimate ($\hat{R}$) of the frequency spectrum (R) of the reverberations part (r), (iv) a second delay device for receiving the estimate ($\hat{R}$) and outputting a delayed estimate, and (v) a second amplifier for multiplying the delayed estimate by a factor of the first parameter ($\alpha$) minus the second parameter ($\beta$) and outputting the second amplified output, wherein the filter device is responsive to the first parameter ($\alpha$), the second parameter ($\beta$) and the frequency spectrum (Y) of the signal (y) for providing the estimate ($\hat{R}$) of the frequency spectrum (R) of the reverberations part (r), and
wherein the first parameter ($\alpha$) is indicative of the decay of the reverberations part (r) over time, and wherein the second parameter ($\beta$) is indicative of a step in relative energy content in an energy decay curve of a room impulse response, wherein the step occurs in the energy decay curve between a first region and a third region of the energy decay curve, wherein the first region contains the energy decay curve of a first signal decay with no significant signal components, a second region contains the energy decay curve of the direct signal part (d), and the third region contains the energy decay curve of an indirect signal component of the reverberations part (r), further wherein the step is indicative of an amplitude of the direct part (d) relative to an amplitude of the reverberations part (r) of the signal (y).

13. The device according to claim 12, wherein the second parameter ($\beta$) is inversely proportional to the early-to-late ratio (ELR) of the signal (y).

14. The device according to claim 12, wherein the means for providing an estimate ($\hat{R}$) of the frequency spectrum (R) of the reverberations part (r) are arranged for using a previous estimate ($\hat{R}$) of the frequency spectrum (R) of the reverberations part (r).

15. The device according to claim 12, further comprising means for:
defining frames ($\kappa$) containing time-limited segments of the signal (y), and
determining, for each frame ($\kappa$), the frequency spectrum (Y) of the signal (y).

16. The device according to claim 15, wherein the frames overlap partially.

17. The device according to claim 15, further comprising means for:
providing, for each frame ($\kappa$), an estimated frequency spectrum ($\hat{R}$) of the reverberations part (r) using the frequency spectrum (Y) of a previous frame, the first parameter ($\alpha$), the second parameter ($\beta$), and the estimated frequency spectrum ($\hat{R}$) of the reverberations part (r) of a previous frame.

18. The device according to claim 17, wherein the previous frame is an immediately preceding frame ($\kappa$-1).

19. The device according to claim 12, further comprising: means for determining the second parameter ($\beta$).

20. The device according to claim 19, wherein the means for determining the second parameter ($\beta$) are arranged for determining the second parameter ($\beta$) for each frame ($\kappa$) separately.

21. The device according to claim 12, further comprising:
means for determining a gain factor $G(\kappa B, m)$ using the frequency spectrum (Y) of a previous frame and the estimated frequency spectrum ($\hat{R}$) of the reverberations part (r), wherein the gain factor $G(\kappa B, m)$ multiplied by the absolute value of the frequency spectrum (Y) produces an estimate ($\hat{D}$) of a dereverberated frequency spectrum of the direct part (d) of the signal (y).

22. The device according to claim 21, further comprising:
means for multiplying the gain factor $G(\kappa B, m)$ and the absolute value of frequency spectrum (Y) so as to produce the estimate ($\hat{D}$) of the dereverberated frequency spectrum of the direct part (d) of the signal (v).

23. The device according to claim 22, further comprising:
decomposition means for separating a phase ($\phi$) and a magnitude ($\rho$) of the frequency spectrum (Y) of the signal (y), wherein the magnitude ($\rho$) corresponds to the absolute value of the frequency spectrum (Y);

reconstruction means for reconstructing a frequency spectrum corresponding to the dereverberated frequency spectrum using the phase ($\phi$) and a dereverberated spectral magnitude ($\rho'$) of the estimate ($\hat{D}$).

24. The device according to claim 23, further comprising:
means for determining the direct part (d) using the estimate ($\hat{D}$) of the frequency spectrum of the direct part (d).

25. An audio processing system, comprising a device according to claim 12.

26. The audio processing system of claim 25, further comprising a part incorporated into one selected from the group consisting of a speech recognition system, a conference system, and a hands-free telephony system.

27. A device for estimating the reverberations in a signal (y) including a direct part (d) and a reverberations part (r), the device comprising:
means for providing an estimate ($\hat{R}$) of the frequency spectrum (R) of the reverberations part (r) using a first parameter ($\alpha$), a second parameter ($\beta$) and the frequency spectrum (Y) of the signal (y), said means including a filter device that comprises (i) a first delay device for receiving an absolute value of the frequency spectrum (Y) of the signal (y) and outputting a delayed absolute value of the frequency spectrum (Y), (ii) a first amplifier for multiplying the delayed absolute value of the frequency spectrum (Y) by the second parameter ($\beta$) and outputting a first amplified output, (iii) a combination device for receiving and combining the first amplified output with a second amplified output and for outputting the combined first and second amplified outputs as the estimate ($\hat{R}$) of the frequency spectrum (R) of the reverberations part (r), (iv) a second delay device for receiving the estimate ($\hat{R}$) and outputting a delayed estimate, and (v) a second amplifier for multiplying the delayed estimate by a factor of the first parameter ($\alpha$) minus the second parameter ($\beta$) and outputting the second amplified output, wherein the filter device is responsive to the first parameter ($\alpha$), the second parameter ($\beta$) and the frequency spectrum (Y) of the signal (y) for providing the estimate ($\hat{R}$) of the frequency spectrum (R) of the reverberations part (r), and wherein the first parameter ($\alpha$) is indicative of a decay of the reverberations part (r) over time, and wherein the second parameter ($\beta$) is indicative of an amplitude of the direct part (d) relative to the reverberations part (r) of the signal (y), wherein the estimate ($\hat{R}$) of the frequency spectrum (R) of the reverberations part (r) is equal to (i) the first parameter ($\alpha$) times a previous absolute value of the frequency spectrum (Y), minus (ii) third parameter ($\gamma$) times the difference of the previous absolute value of the frequency spectrum (Y) and a previous estimate ($\hat{R}$) of the frequency spectrum (R) of the reverberations signal (r), wherein (iii) the third parameter ($\gamma$) is equal to the first parameter ($\alpha$) minus the second parameter ($\beta$).

\* \* \* \* \*